United States Patent
Nishimori et al.

(10) Patent No.: US 8,895,165 B2
(45) Date of Patent: Nov. 25, 2014

(54) METHOD OF MANUFACTURING A GLASS SUBSTRATE FOR A MAGNETIC DISK, GLASS SUBSTRATE FOR A MAGNETIC DISK, METHOD OF MANUFACTURING A MAGNETIC DISK, AND MAGNETIC DISK

(75) Inventors: Kenichi Nishimori, Amphur Muang (TH); Tadashi Tomonaga, Tokyo (JP)

(73) Assignees: Hoya Corporation, Tokyo (JP); Hoya Glass Disk (Thailand) Ltd., Lamphun (TH)

( * ) Notice: Subject to any disclaimer, the term of this patent is extended or adjusted under 35 U.S.C. 154(b) by 107 days.

(21) Appl. No.: 13/063,106

(22) PCT Filed: Sep. 2, 2009

(86) PCT No.: PCT/JP2009/065312
§ 371 (c)(1),
(2), (4) Date: Mar. 9, 2011

(87) PCT Pub. No.: WO2010/029878
PCT Pub. Date: Mar. 18, 2010

(65) Prior Publication Data
US 2011/0165439 A1   Jul. 7, 2011

(30) Foreign Application Priority Data

Sep. 10, 2008 (JP) ................................. 2008-231989
Sep. 10, 2008 (JP) ................................. 2008-231990
Mar. 31, 2009 (JP) ................................. 2009-086065

(51) Int. Cl.
- *G11B 5/73* (2006.01)
- *G11B 5/82* (2006.01)
- *B05B 5/12* (2006.01)
- *G11B 5/84* (2006.01)

(52) U.S. Cl.
CPC ............ *G11B 5/8404* (2013.01); *G11B 5/7315* (2013.01); *G11B 2220/23* (2013.01)
USPC ..................... 428/846.9; 428/846.8; 427/129; 65/60.4; 451/41; 360/135

(58) Field of Classification Search
CPC . G11B 5/8404; G11B 5/7315; G11B 2220/23
USPC ............ 428/846.9, 848, 848.8, 848.4, 848.6, 428/831, 831.1, 8, 84, 61.1, 213, 800, 64.1, 428/64.4, 846, 846.3, 846.8; 427/402, 129; 501/67, 68, 64, 62, 66, 67.1, 64.4, 501/64.1, 66.6, 61, 32.5, 70, 72; 360/254.7, 360/135; 451/44, 41; 216/22; 65/30.14, 65/29.16, 29.21, 99.2, 60.4, 60.1, 60.5; 29/90.1, 603.01
See application file for complete search history.

(56) References Cited

U.S. PATENT DOCUMENTS 6,673,474 B2 * 1/2004 Yamamoto ................. 428/846.9
2001/0019785 A1 * 9/2001 Shimada ....................... 428/848
(Continued)

FOREIGN PATENT DOCUMENTS

JP  2001-351229 A  12/2001
JP  2002-334423 A  11/2002
(Continued)

OTHER PUBLICATIONS

Ikeda, JP 2002-334423, machine translation, Nov. 2002.*

*Primary Examiner* — Kevin M. Bernatz
*Assistant Examiner* — Louis Falasco
(74) *Attorney, Agent, or Firm* — Sughrue Mion, PLLC (57) ABSTRACT

Provided is a method of manufacturing a magnetic disk glass substrate, wherein, in a main surface polishing process, main surface polishing is applied to one of main surfaces of a glass substrate so that the one main surface has a predetermined arithmetic mean roughness, and main surface polishing is applied to the other main surface of the glass substrate so that the other main surface has a roughness which is higher than the arithmetic mean roughness (Ra) of the one main surface and which is low enough to prevent a component forming the magnetic disk glass substrate from being eluted from the other main surface.

7 Claims, 4 Drawing Sheets

(56) References Cited

U.S. PATENT DOCUMENTS

| | | | |
|---|---|---|---|
| 2002/0054974 A1* | 5/2002 | Takahashi et al. | 428/64.4 |
| 2002/0054976 A1* | 5/2002 | Nakamura et al. | 65/66 |
| 2002/0060883 A1* | 5/2002 | Suzuki | 360/254.7 |
| 2002/0142707 A1* | 10/2002 | Shimada et al. | 451/44 |
| 2003/0134734 A1 | 7/2003 | Nishimoto et al. | |
| 2003/0211275 A1* | 11/2003 | Buitron et al. | 360/135 |
| 2003/0220183 A1* | 11/2003 | Kurachi et al. | 501/70 |
| 2005/0096210 A1* | 5/2005 | Kawai | 501/69 |
| 2005/0181218 A1* | 8/2005 | Shiraishi et al. | 501/55 |
| 2005/0215414 A1* | 9/2005 | Kawai | 501/69 |
| 2005/0238927 A1 | 10/2005 | Horie et al. | |
| 2007/0044514 A1* | 3/2007 | Naitou et al. | 65/30.14 |
| 2007/0202312 A1* | 8/2007 | Kim et al. | 428/848.4 |
| 2007/0295030 A1* | 12/2007 | Nakamura et al. | 65/29.16 |
| 2008/0213626 A1* | 9/2008 | Kobayashi et al. | 216/22 |
| 2009/0118113 A1* | 5/2009 | Yagi | 501/72 |
| 2009/0162703 A1* | 6/2009 | Kawai | 428/846.2 |
| 2010/0247974 A1* | 9/2010 | Kimura et al. | 428/846 |
| 2010/0247976 A1* | 9/2010 | Mizuno et al. | 428/846.3 |
| 2010/0247978 A1* | 9/2010 | Fukada et al. | 428/848 |

FOREIGN PATENT DOCUMENTS

| | | |
|---|---|---|
| JP | 2002-338274 A | 11/2002 |
| JP | 2003-063831 A | 3/2003 |
| JP | 2005-310324 A | 11/2005 |

* cited by examiner

METHOD OF MANUFACTURING A GLASS SUBSTRATE FOR A MAGNETIC DISK, GLASS SUBSTRATE FOR A MAGNETIC DISK, METHOD OF MANUFACTURING A MAGNETIC DISK, AND MAGNETIC DISK

TECHNICAL FIELD

This invention relates to a method of manufacturing a glass substrate for a magnetic disk adapted to be mounted in a hard disk drive device, the glass substrate for the magnetic disk, a method of manufacturing the magnetic disk, and the magnetic disk.

BACKGROUND ART

As a magnetic recording medium adapted to be mounted in a hard disk drive device (HDD device), there is a magnetic disk. The magnetic disk is produced by stacking a magnetic layer and a protective layer over a substrate in which a NiP film is coated on a metal plate made of an aluminum-magnesium alloy or the like, a glass substrate, or a ceramic substrate. Aluminum alloy substrates have conventionally been widely used as substrates for magnetic disks. However, following the reduction in size and thickness and the increase in recording density of magnetic disks in recent years, glass substrates excellent in surface flatness and thin-plate strength as compared with the aluminum alloy substrates have started to be used.

Such a magnetic disk glass substrate is manufactured through processes such as a material processing process and a first lapping process (first grinding process); an end portion shaping process (coring process for forming a hole and chamfering process for forming chamfered faces at end portions (outer peripheral end portion and inner peripheral end portion) (chamfered face forming process)); an end face polishing process (outer peripheral end portion and inner peripheral end portion); a second lapping process (second grinding process); a main surface polishing process (first and second polishing processes); and a chemical strengthening process.

The recording density of a magnetic disk has been increasing year by year and even a magnetic disk with 100 GB or more on its one side has been developed. Currently, the magnetic disk satisfies a required recording capacity as the sum on both sides thereof. However, if the recording density increases in this manner, the required recording capacity will be satisfied only on one side of a magnetic disk in the case of an electronic device that does not require a so large recording capacity. If the required recording capacity is satisfied only on one side of the magnetic disk as described above, the number of components can be reduced on the HDD device side such that a single magnetic head is provided for one magnetic disk. This is advantageous in terms of cost and further makes it possible to achieve a reduction in thickness of the HDD device. Therefore, it is expected that from now on there will be an increasing need for a magnetic disk having a magnetic layer only on one side thereof (see, e.g. JP-A-2001-351229 (Patent Document 1)).

PRIOR ART DOCUMENT

Patent Document

Patent Document 1: JP-A-2001-351229

SUMMARY OF THE INVENTION

Problem to be Solved by the Invention

With respect to a glass substrate for such a magnetic disk having the magnetic layer only on its one side as described above, the main surface polishing process for a main surface to be provided with no magnetic layer is omitted to thereby reduce costs (polishing cloth, polishing agent (slurry), processing cost, labor cost, etc.). In particular, it is efficient to achieve the cost reduction by omitting the second polishing process which reduces the arithmetic surface roughness to a very low level.

In the meantime, as a glass of a magnetic disk glass substrate, use is often made of an aluminosilicate glass containing an alkali metal such as sodium or lithium. Such an alkali metal is eluted on a substrate surface depending on environment. If the alkali metal is eluted on the substrate surface as described above, it is recognized as white dirt by visual observation (so-called corrosion). Although such dirt can be removed by a cleaning process, it causes contamination of a cleaning apparatus and thus should be suppressed as much as possible.

This invention has been made in view of these circumstances and has an object to provide a magnetic disk glass substrate manufacturing method that can obtain a glass substrate for a magnetic disk with high recording density which uses only one side thereof as a recording surface while preventing the occurrence of corrosion, and to provide such a magnetic disk glass substrate. Further, this invention has an object to provide a magnetic disk with high recording density that can use only one side thereof as a recording surface while preventing the elution of a substrate forming component, and to provide a method of manufacturing such a magnetic disk.

Means for Solving the Problem

According to this invention, there is provided a method of manufacturing a magnetic disk glass substrate, comprising a main surface polishing step of polishing a glass substrate having a pair of main surfaces, wherein, in the main surface polishing step, main surface polishing is applied to one of the main surfaces of the glass substrate so that the one main surface has a predetermined arithmetic mean roughness (Ra), and main surface polishing is applied to the other main surface of the glass substrate so that the other main surface has a roughness which is higher than the arithmetic mean roughness (Ra) of the one main surface and which is low enough to prevent a component forming the magnetic disk glass substrate from being eluted from the other main surface.

According to this method, in the main surface polishing step, the main surface polishing is carried out so that the roughness becomes low enough to prevent the elution of the component forming the magnetic disk glass substrate. Therefore, it is possible to prevent the elution of the substrate forming component from the main surface not intended to be used as a magnetic recording surface and thus to suppress the occurrence of corrosion on the surface not intended to be used as the magnetic recording surface.

According to this invention, there is provided a method of manufacturing a magnetic disk glass substrate, comprising: a main surface polishing step of polishing a glass substrate having a pair of main surfaces, wherein, in the main surface polishing step, main surface polishing is applied to one of the main surfaces of the glass substrate so that the one main surface has an arithmetic mean roughness (Ra) required for magnetic recording, and main surface polishing is applied to the other main surface of the glass substrate so that the other main surface has a roughness which is higher than the arithmetic mean roughness (Ra) of the one main surface and which is low enough to prevent elution of a component forming the magnetic disk glass substrate.

According to this method, the main surface intended to be used as a magnetic recording surface has an arithmetic mean roughness required for magnetic recording and, further, it is possible to prevent the elution of the substrate forming component from the main surface not intended to be used as a magnetic recording surface and thus to suppress the occurrence of corrosion on the surface not intended to be used as the magnetic recording surface.

In the magnetic disk glass substrate manufacturing method according to this invention, in the main surface polishing step, it is preferable that the number of times of main surface polishing for the other main surface of the glass substrate is smaller than the number of times of main surface polishing for the one main surface of the glass substrate. According to this method, it is possible to achieve cost reduction and so on.

In the magnetic disk glass substrate manufacturing method according to this invention, it is preferable that the roughness low enough to prevent the component forming the magnetic disk glass substrate from being eluted from the other main surface is 5.0 nm or less. If the roughness of the other main surface is 5.0 nm or less, at least final main surface polishing does not need to be carried out for the other main surface of the glass substrate in the main surface polishing step.

In the magnetic disk glass substrate manufacturing method according to this invention, it is preferable that the main surface polishing is applied to the one main surface of the glass substrate so that the arithmetic mean roughness (Ra) of the one main surface becomes 0.30 nm or less.

It is preferable that the magnetic disk glass substrate manufacturing method according to this invention further comprises a step of identifying the one main surface of the magnetic disk glass substrate by optical automatic visual inspection.

According to this invention, there is provided a magnetic disk glass substrate having a pair of main surfaces, wherein one of the main surfaces has a predetermined arithmetic mean roughness (Ra) and the other main surface has a roughness which is higher than the arithmetic mean roughness (Ra) of the one main surface and which is low enough to prevent a component forming the magnetic disk glass substrate from being eluted from the other main surface. According to this structure, only one surface can be used for a magnetic recording layer in the state where the occurrence of corrosion is suppressed on the surface not used as a magnetic recording surface.

According to this invention, there is provided a magnetic disk glass substrate having a pair of main surfaces, wherein one of the main surfaces has an arithmetic mean roughness (Ra) required for magnetic recording and the other main surface has a roughness which is higher than the arithmetic mean roughness (Ra) of the one main surface and which is low enough to prevent elution of a component forming the magnetic disk glass substrate. According to this structure, in the state where the occurrence of corrosion is suppressed on the surface not used as a magnetic recording surface, it is possible to realize a one-side magnetic recording layer that can exhibit required characteristics.

A magnetic disk according to this invention comprises at least a magnetic recording layer formed on the one main surface of the magnetic disk glass substrate.

In the magnetic disk according to this invention, it is preferable that at least the magnetic recording layer is formed on only the one main surface of the magnetic disk glass substrate while a substrate forming component elution preventing layer is formed on the other main surface of the magnetic disk glass substrate. The substrate forming component elution preventing layer is adapted to prevent elution of the component forming the magnetic disk glass substrate.

According to this structure, the substrate forming component elution preventing layer adapted to prevent the elution of the component forming the magnetic disk glass substrate is formed on the main surface of the magnetic disk glass substrate. Therefore, when the other main surface of the magnetic disk glass substrate has the roughness low enough to prevent the elution of the component forming the magnetic disk glass substrate, it is possible to further block the elution of the substrate forming component from the main surface and thus to further suppress the occurrence of corrosion on the surface not used as a magnetic recording surface.

According to this invention, there is provided a magnetic disk, comprising a magnetic disk glass substrate having a pair of main surfaces, and a magnetic recording layer formed on the magnetic disk glass substrate. At least the magnetic recording layer is formed only on one of the main surfaces, which has an arithmetic mean roughness (Ra) required for magnetic recording, of the magnetic disk glass substrate. A substrate forming component elution preventing layer is formed on the other main surface and is adapted to prevent elution of a component forming the magnetic disk glass substrate.

According to this structure, the substrate forming component elution preventing layer adapted to prevent the elution of the component forming the magnetic disk glass substrate is formed on the main surface of the magnetic disk glass substrate. Therefore, it is possible to block the elution of the substrate forming component from the main surface and thus to suppress the occurrence of corrosion on the surface not used as a magnetic recording surface. In this case, the roughness of the main surface, on the side where the substrate forming component elution preventing layer is formed, of the magnetic disk glass substrate is preferably 6 nm or less. If the roughness falls within this range, it is possible to effectively suppress the occurrence of corrosion.

In the magnetic disk according to this invention, it is preferable that the substrate forming component elution preventing layer has a thickness of 4 nm or more. With the thickness of 4 nm or more, it is possible to obtain a sufficient effect as the substrate forming component elution preventing layer.

In the magnetic disk according to this invention, it is preferable that the substrate forming component elution preventing layer is formed of titanium alone or a titanium alloy.

In the magnetic disk according to this invention, it is preferable that a disk warp preventing layer is formed on the substrate forming component elution preventing layer.

In the magnetic disk according to this invention, it is preferable that a protective layer adapted to be formed on the magnetic recording layer is formed on the substrate forming component elution preventing layer or the disk warp preventing layer.

In the magnetic disk according to this invention, it is preferable that a total layer thickness formed on the one main surface and a total layer thickness formed on the other main surface are equal to each other. According to this structure, the film stresses on both main surfaces are balanced so that it is possible to suppress warping of the magnetic disk.

According to this invention, there is provided a method of manufacturing a magnetic disk comprising a magnetic disk substrate obtained through a main surface polishing step of polishing a glass substrate having a pair of main surfaces and at least a magnetic recording layer formed on the magnetic disk substrate, at least the magnetic recording layer being formed on only one of the main surfaces.

According to this invention, there is provided a method of manufacturing a magnetic disk comprising a magnetic disk substrate obtained through a main surface polishing step of polishing a glass substrate having a pair of main surfaces and at least a magnetic recording layer formed on the magnetic disk substrate, the method comprising forming at least the magnetic recording layer on only one of the main surfaces and forming, on the other main surface, a substrate forming component elution preventing layer adapted to prevent a component forming the magnetic disk glass substrate from being eluted from the other main surface.

According to this method, the substrate forming component elution preventing layer adapted to prevent the elution of the component forming the magnetic disk glass substrate is formed on the main surface of the magnetic disk glass substrate. Therefore, it is possible to suppress the elution of the substrate forming component from the main surface and thus to suppress the occurrence of corrosion on the surface not used as a magnetic recording surface.

Effect of the Invention

In the method of manufacturing a magnetic disk glass substrate according to this invention, in the main surface polishing step, main surface polishing is applied to one of the main surfaces of the glass substrate so that the one main surface has a predetermined arithmetic mean roughness (Ra), and main surface polishing is applied to the other main surface of the glass substrate so that the other main surface has a roughness which is higher than the arithmetic mean roughness (Ra) of the one main surface and which is low enough to prevent a component forming the magnetic disk glass substrate from being eluted from the other main surface. Therefore, it is possible to prevent the elution of the substrate forming component from the main surface not intended to be used as a magnetic recording surface and thus to suppress the occurrence of corrosion on the surface not intended to be used as the magnetic recording surface.

In the magnetic disk glass substrate according to this invention, one of the main surfaces has a predetermined arithmetic mean roughness (Ra) and the other main surface has a roughness which is higher than the arithmetic mean roughness (Ra) of the one main surface and which is low enough to prevent a component forming the magnetic disk glass substrate from being eluted from the other main surface. Therefore, it is possible to prevent the elution of the substrate forming component from the main surface not intended to be used as a magnetic recording surface and thus to suppress the occurrence of corrosion on the surface not intended to be used as the magnetic recording surface.

In the magnetic disk according to this invention, at least the magnetic recording layer is formed only on one of the main surfaces, which has an arithmetic mean roughness (Ra) required for magnetic recording of the magnetic disk glass substrate having a pair of the main surfaces, and a substrate forming component elution preventing layer is formed on the other main surface. The substrate forming component elution preventing layer is adapted to prevent elution of a component forming the magnetic disk glass substrate. Therefore, it is possible to block the elution of the substrate forming component from the main surface not used as a magnetic recording surface and thus to suppress the occurrence of corrosion on the surface not used as the magnetic recording surface.

The method of manufacturing a magnetic disk according to this invention comprises forming at least a magnetic recording layer only on one of the main surfaces of the magnetic disk glass substrate obtained through a main surface polishing step of polishing a glass substrate having a pair of the main surfaces, and forming, on the other main surface, a substrate forming component elution preventing layer adapted to prevent a component forming the magnetic disk glass substrate from being eluted from the other main surface. Therefore, it is possible to block the elution of the substrate forming component from the main surface not used as a magnetic recording surface and thus to suppress the occurrence of corrosion on the surface not used as the magnetic recording surface.

MODE FOR CARRYING OUT THE INVENTION

Hereinbelow, an embodiment of this invention will be described in detail with reference to the accompanying drawings.

In this embodiment, as a material of a magnetic disk glass substrate, use can be made of an aluminosilicate glass, a sodalime glass, a borosilicate glass, or the like. In particular, the aluminosilicate glass can be preferably used because it can be chemically strengthened and it can provide a magnetic disk glass substrate excellent in flatness of main surfaces thereof and in substrate strength.

Manufacturing processes of a magnetic disk glass substrate include processes such as Material Processing Process and First Lapping Process; End Portion Shaping Process (coring process for forming a hole and chamfering process for forming chamfered faces at end portions (outer peripheral end portion and/or inner peripheral end portion) (chamfered face forming process)); Second Lapping Process; End Face Polishing Process (outer peripheral end portion and inner peripheral end portion); Main Surface Polishing Process (first and second polishing processes); and Chemical Strengthening Process.

Hereinbelow, the manufacturing processes of the magnetic disk glass substrate will be described, respectively. Further, a description will be given of a manufacturing process of a magnetic disk using the manufactured magnetic disk glass substrate. The order of the respective processes may be appropriately changed.

(1) Material Processing Process and First Lapping Process

First, in the material processing process, a plate-like glass can be manufactured by a known manufacturing method such as a press method, a float method, a downdraw method, a redraw method, or a fusion method using, for example, a molten glass as a material. If the press method is used among these methods, the plate-like glass can be manufactured at low cost.

In the first lapping process, lapping is applied to both main surfaces of the plate-like glass, thereby obtaining a disk-shaped glass base member. The lapping can be carried out using a double-side lapping machine employing a planetary gear mechanism with the use of alumina-based free abrasive particles. Specifically, the lapping is carried out by pressing lapping surface plates onto both surfaces of the plate-like glass from the upper and lower sides, supplying a grinding fluid containing the free abrasive particles onto the main surfaces of the plate-like glass, and relatively moving them to each other. By this lapping, a glass substrate having flat main surfaces can be obtained.

(2) End Portion Shaping Process (Coring Process for Forming a Hole and Chamfering Process for Forming Chamfered Faces at End Portions (Outer Peripheral End Portion and Inner Peripheral End Portion) (Chamfered Face Forming Process))

In the coring process, using, for example, a cylindrical diamond drill, an inner hole is formed at a central portion of the glass substrate, thereby obtaining an annular glass substrate. In the chamfering process, grinding is applied to an inner peripheral end face and an outer peripheral end face using diamond grindstones, thereby carrying out predetermined chamfering.

(3) Second Lapping Process

In the second lapping process, second lapping is applied to both main surfaces of the obtained glass substrate in the same manner as in the first lapping process. By performing this second lapping process, minute irregularities, surface damages, cracks, and the like formed on the main surfaces in the previous processes are removed and the surface roughness thereof is further reduced than that in the first lapping process, so that it becomes possible to complete a subsequent polishing process of the main surfaces in a short time.

(4) End Face Polishing Process

In the end face polishing process, the outer peripheral end face and the inner peripheral end face of the glass substrate are mirror-polished by a brush polishing method. In this event, as polishing abrasive particles, use may be made of, for example, a slurry (free abrasive particles) containing cerium oxide abrasive particles. By this end face polishing process, contaminants, damages, and cracks on the end faces of the glass substrate are removed so that the end faces of the glass substrate are finished to a state that can prevent precipitation of sodium or potassium ions that would cause corrosion.

(5) Main Surface Polishing Process (First Polishing Process)

The first polishing process is first carried out as a main surface polishing process. The first polishing process is a process that mainly aims to remove cracks and strains remaining on the main surfaces during the above-mentioned two-stage lapping processes and to carry out pre-stage roughness adjustment for creating a surface roughness in a final polishing process. In this first polishing process, the main surfaces are polished using a double-side polishing machine having a planetary gear mechanism with the use of a hard resin polisher. Cerium oxide abrasive particles can be used as a polishing agent.

In the first polishing process, polishing is carried out so that the roughness becomes low enough to prevent a component (e.g. alkali metal) forming the glass substrate from being eluted from its surface (surface to be provided with no magnetic recording layer) opposite to its magnetic recording surface.

Figure 1:
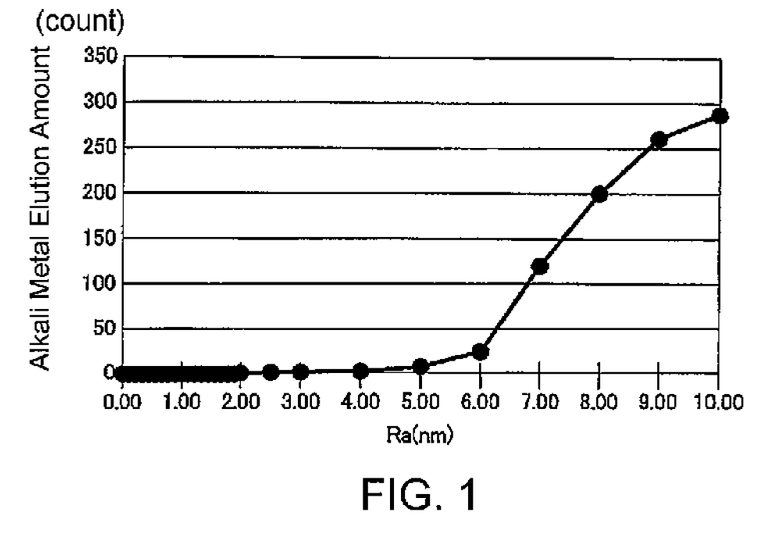
FIG. 1 is a characteristic diagram showing a relationship between the arithmetic mean roughness (Ra) of a glass substrate formed of an aluminosilicate glass and the elution amount of an alkali metal which is a component forming the glass substrate.

The present inventors have paid attention to a relationship between the arithmetic mean roughness (Ra) of a main surface of a glass substrate and the elution of a component forming the glass substrate. FIG. 1 is a characteristic diagram showing a relationship between the arithmetic mean roughness (Ra) of a glass substrate formed of an aluminosilicate glass and the elution amount of an alkali metal which is a component forming the glass substrate. Herein, the arithmetic mean roughness can be obtained by measuring, for example, a measurement region of 2 μm×2 μm square with a resolution of 256×256 pixels using an atomic force microscope. The elution amount of the alkali metal represents an elution amount upon conducting a corrosion test in which the glass substrate is exposed to an 80° C., 80% RH environment for 7 days. Further, count represents the number of luminescent spots per unit area (region of about 200 μm×300 μm) obtained by measuring the glass substrate after the corrosion test using an optical microscope (×200 magnification). This "luminescent spot" is induced by the alkali component that is diffused to a surface of the glass substrate due to acceleration of alkali diffusion in the high-temperature, high-humidity environment. Therefore, as the number of luminescent spots increases, the corrosion resistance decreases.

As seen from FIG. 1, when the arithmetic mean roughness (Ra) increases to a certain level, the corrosion resistance is lowered. Therefore, there exist roughnesses that are low enough to prevent the elution of the component forming the glass substrate. Based on this knowledge, the present inventors have found that, in a glass substrate for a magnetic disk adapted to use only one side thereof as a recording surface, a surface of the glass substrate, which is not intended to be used as a recording surface, should also be polished to an arithmetic mean roughness of a certain level, and have completed this invention.

That is, the gist of this invention is that, in a main surface polishing process, main surface polishing is applied to one of main surfaces of a glass substrate so that the one main surface has a predetermined arithmetic mean roughness, and main surface polishing is applied to the other main surface of the glass substrate so that the other main surface has a roughness which is higher than the arithmetic mean roughness (Ra) of the one main surface, but is low enough to prevent a component forming the magnetic disk glass substrate from being eluted from the other main surface, thereby suppressing the occurrence of corrosion on the surface, not intended to be used as a recording surface, of the glass substrate for a magnetic disk which uses only one side thereof as a magnetic recording surface.

Therefore, in the first polishing process, polishing is applied to the main surfaces so that, at least, the arithmetic mean roughness of the surface opposite to the magnetic recording surface becomes low enough to prevent the elution of the component forming the magnetic disk glass substrate. The roughness which is low enough to prevent the elution of the component forming the magnetic disk glass substrate is, for example, 5.0 nm or less. In this manner, by applying polishing to the surface opposite to the magnetic recording surface so that the arithmetic mean roughness thereof becomes low enough to prevent the elution of the component forming the magnetic disk glass substrate, it is possible to suppress the occurrence of corrosion on the surface, not intended to be used as a magnetic recording surface, of the glass substrate for a magnetic disk with high recording density which uses only one side thereof as a magnetic recording surface.

(6) Main Surface Polishing Process (Final Polishing Process)

Then, the second polishing process is carried out as a final polishing process. The second polishing process is a process that aims to finish only one of both main surfaces, which is intended to be used as a recording surface, to a mirror surface state. In the second polishing process, main surface mirror polishing is carried out using a double-side polishing machine having a planetary gear mechanism with the use of a soft resin foam polisher. As a slurry, use can be made of cerium oxide abrasive particles, colloidal silica, or the like finer than the cerium oxide abrasive particles used in the first polishing process.

Figure 2:
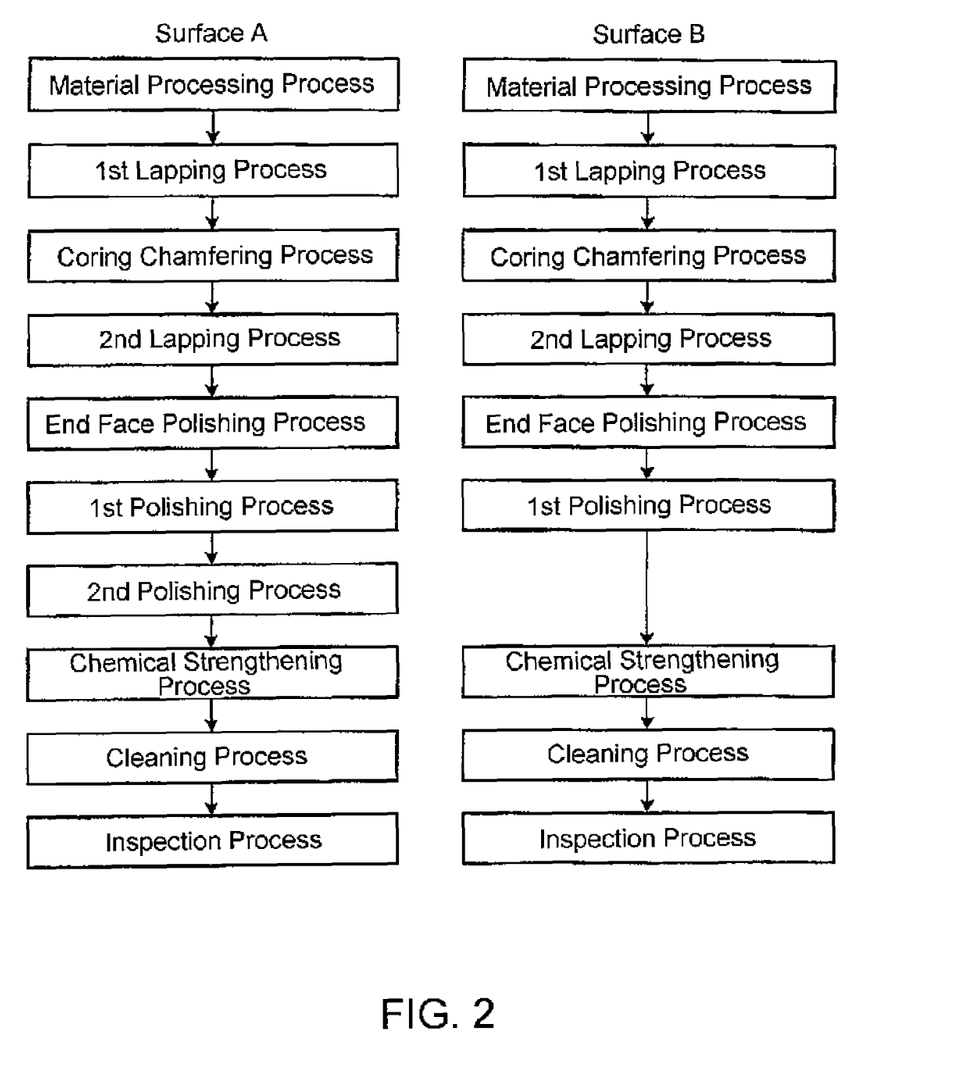
FIG. 2 is a diagram showing a specific sequence of manufacturing processes of a magnetic disk glass substrate according to an embodiment of this invention.

In the method of this invention, it is preferable that final polishing be applied only to such a main surface that is intended to be used as a magnetic recording surface. That is, as shown in FIG. 2, final polishing is carried out with respect to a main surface (surface A) intended to be used as a magnetic recording surface while final polishing is not carried out with respect to a main surface (surface B) not intended to be used as a magnetic recording surface. Therefore, in a magnetic disk glass substrate thus obtained, the surface A has a predetermined arithmetic mean roughness (Ra) while the surface B has a roughness which is higher than the arithmetic mean roughness of the surface A, but is low enough to prevent a component forming the glass substrate from being eluted from the surface B. This predetermined roughness is, for example, an arithmetic mean roughness required for magnetic recording. The arithmetic mean roughness required for magnetic recording can be determined according to a recording density of a magnetic recording layer.

In order to carry out the final polishing for the surface A but not for the surface B, the final polishing is carried out, for example, in the state where the main surface not intended to be used as the magnetic recording surface is masked. By doing this way, the costly final polishing can be applied only to one of the main surfaces so that it is possible to achieve cost reduction while preventing the elution of the substrate component from the surface not intended to be used as the magnetic recording surface to thereby prevent the occurrence of corrosion.

As a consequence, the number of times of main surface polishing for the main surface, not intended to be used for a magnetic recording layer, of the magnetic disk glass substrate becomes smaller than the number of times of main surface polishing for the main surface, intended to be used for a magnetic recording layer, of the magnetic disk glass substrate. Accordingly, the arithmetic mean roughness (Ra) of the main surface, not intended to be used for the magnetic recording layer, of the magnetic disk glass substrate becomes higher than that of the main surface, intended to be used for the magnetic recording layer, of the magnetic disk glass substrate. In this final polishing process, the main surface polishing is preferably carried out so that the arithmetic mean roughness (Ra) of the main surface, intended to be used for the magnetic recording layer, of the magnetic disk glass substrate becomes 0.30 nm or less.

In FIG. 2, the description is given of the case where the final polishing is not carried out for the surface B. However, in this invention, for example, when the roughness of the surface B is not low enough to prevent the elution of the component forming the glass substrate, the final polishing may be carried out for the surface B. Further, the description has been given above of the case where only the final polishing is not carried out for the surface B, but this invention is not limited thereto. When the roughness of the surface B is low enough to prevent the elution of the component forming the glass substrate, it is not necessary to carry out either the first polishing or the final polishing for the surface B.

(7) Chemical Strengthening Process

In the chemical strengthening process, chemical strengthening is applied to the glass substrate having been subjected to the above-mentioned lapping processes and polishing processes. As a chemical strengthening solution for use in the chemical strengthening, use can be made of, for example, a mixed solution of potassium nitrate (60%) and sodium nitrate (40%). The chemical strengthening is carried out by heating the chemical strengthening solution to 300° C. to 400° C., preheating the cleaned glass substrate to 200° C. to 300° C., and immersing the glass substrate in the chemical strengthening solution for 3 hours to 4 hours. In order to chemically strengthen the entire surfaces of the glass substrate, the immersion is preferably carried out in the state where a plurality of glass substrates are placed in a holder so as to be held at their end faces.

By carrying out the immersion in the chemical strengthening solution as described above, lithium ions and sodium ions in a surface layer of the glass substrate are replaced by sodium ions and potassium ions having relatively large ionic radii in the chemical strengthening solution, respectively, so that the glass substrate is strengthened.

As described above, according to this invention, in the main surface polishing process, the main surface polishing is applied to one of the main surfaces of the magnetic disk glass substrate so that the one main surface has the predetermined arithmetic mean roughness, and the main surface polishing is applied to the other main surface of the magnetic disk glass substrate so that the other main surface has the roughness which is higher than the arithmetic mean roughness (Ra) of the one main surface, but is low enough to prevent the component forming the magnetic disk glass substrate from being eluted from the other main surface. Therefore, it is possible to prevent the elution of the substrate forming component from the main surface not intended to be used as the magnetic recording surface and, thus, it is possible to suppress the occurrence of corrosion on the surface not intended to be used as the magnetic recording surface.

(8) Magnetic Disk Manufacturing Process (Process of Forming a Recording Layer and so on)

Figure 3:
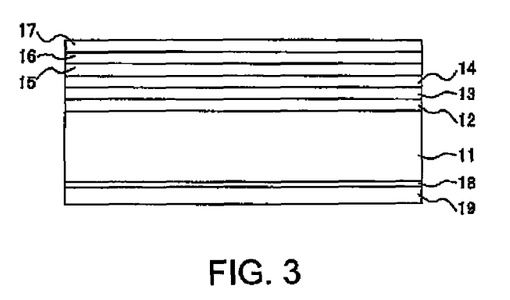
FIG. 3 is a schematic diagram showing a visual inspection apparatus for automated optical inspection.

As shown in FIG. 3, on the surface A of the glass substrate 11 obtained through the above-mentioned processes, an adhesive layer 12, a soft magnetic layer 13, a nonmagnetic underlayer 14, a perpendicular magnetic recording layer 15, a protective layer 16, and a lubricating layer 17 are formed in this order, thereby manufacturing a perpendicular magnetic recording disk. As a material forming the adhesive layer 12, a Cr alloy or the like can be cited. As a material forming the soft magnetic layer 13, a CoTaZr-group alloy or the like can be cited. As the nonmagnetic underlayer 14, a granular nonmagnetic layer or the like can be cited. As the perpendicular magnetic recording layer 15, a granular nonmagnetic layer or the like can be cited. As a material forming the protective layer 16, hydrogenated carbon or the like can be cited. As a material forming the lubricating layer 17, fluororesin or the like can be cited. More specifically, the above-mentioned recording layer and so on are formed such that, for example, using an in-line sputtering apparatus, an adhesive layer of CrTi, a soft magnetic layer of CoTaZr/Ru/CoTaZr, a nonmagnetic granular underlayer of $CoCrSiO_2$, a granular magnetic layer of $CoCrPt$—$SiO_2.TiO_2$, and a protective layer of hydrogenated carbon are formed in this order on the glass substrate and, further, a lubricating layer of perfluoropolyether is formed by a dipping method.

In this process of forming the recording layer and so on, it is preferable that at least the magnetic recording layer be formed on the main surface intended to be used for the magnetic recording layer while, on the main surface not intended to be used for the magnetic recording layer, a substrate forming component elution preventing layer (buffer layer) be formed for preventing the component forming the magnetic disk substrate from being eluted from the main surface. By forming the buffer layer on the surface B, it is possible to further suppress the elution of the substrate forming component from the main surface not intended to be used as the magnetic recording surface and thus to further suppress the occurrence of corrosion on the surface not intended to be used as the magnetic recording surface. A material of the buffer layer is not particularly limited as long as it can prevent the elution of the component forming the magnetic disk glass substrate. However, in terms of capability of reducing the layer thickness, in terms of excellent adhesion to the glass substrate, in terms of low cost, and so on, a film of titanium alone or a titanium alloy or a film of chromium alone or a chromium alloy is preferable and a CrTi film is particularly preferable.

In the above description, the structure is shown in which the roughness of the surface B of the magnetic disk glass substrate is set low enough to prevent the elution of the component forming the magnetic disk glass substrate and, specifically, is set to 5 nm or less. However, when the buffer layer is provided on the surface B, the structure is not limited thereto. This is because the elution of the component can be suppressed by forming the buffer layer on the surface B. For example, even when the roughness of the surface B of the magnetic disk glass substrate is, specifically, in a range of more than 5 nm and no more than 6 nm, it is possible, by forming the buffer layer on the surface B, to suppress the elution of the component to a level that causes no problem in using an HDD device incorporated with such a magnetic disk glass substrate.

Figure 4:
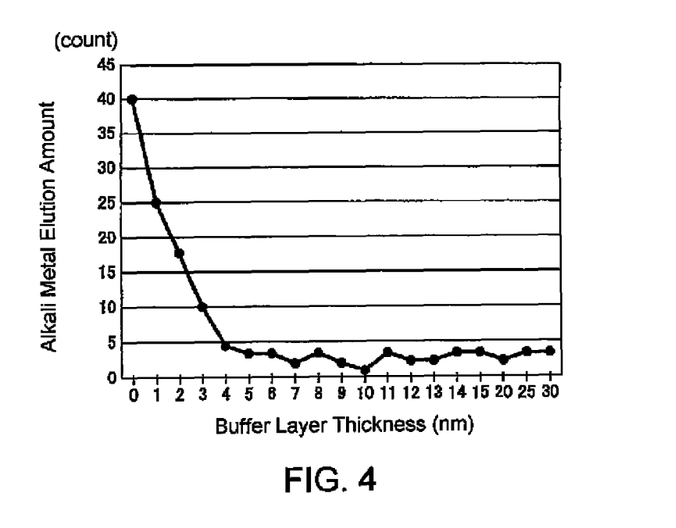
FIG. 4 is a characteristic diagram showing a relationship between the thickness of a substrate forming component elution preventing layer on a glass substrate formed of an aluminosilicate glass and the elution amount of an alkali metal which is a component forming the glass substrate.

The present inventors have paid attention to a relationship between the thickness of the buffer layer and the elution of the component forming the glass substrate. FIG. 4 is a characteristic diagram showing a relationship between the thickness of a buffer layer formed on a glass substrate made of a multi-component glass such as an aluminosilicate glass and the elution amount of an alkali metal which is a component forming the glass substrate. With respect to the elution amount of the alkali metal, a magnetic disk is exposed to a 65° C., 90% RH environment for 5 days and then assembled into an HDD device, then a seek test is carried out (counting the number of read/write errors (R/W errors) during 40,000,000 times seeking), and the count number is given as an alkali metal elution amount. The roughness of a surface B is 6 nm. That is, corrosion is promoted in a high-temperature, high-humidity environment and corrosion products coming from the surface (surface B) which is not used for a magnetic recording layer are scattered due to the disk rotation and adhere to a magnetic head in the seek test on a surface (surface A) which is used for a magnetic recording layer, thereby causing R/W errors. Therefore, as the count number increases, the alkali metal elution amount increases (corrosion resistance decreases). The multi-component glass is a glass obtained by adding, to Si forming the main skeleton of the glass, other components for improving dissolution and other properties of the glass and there are many glasses other than the above-mentioned aluminosilicate glass. Among them, the aluminosilicate glass, an aluminoborosilicate glass, or a sodalime glass is particularly preferable as a magnetic disk glass substrate.

As seen from FIG. 4, when the thickness of the buffer layer decreases to a certain level, the corrosion resistance is lowered. Therefore, there exist buffer layer thicknesses that are sufficient to prevent the elution of the component forming the glass substrate. Based on this knowledge, the present inventors have found that, in order to block the elution of a substrate forming component, it is necessary to form a buffer layer of a certain thickness on a surface, not intended to be used as a magnetic recording surface, of a magnetic disk glass substrate, and have completed this invention.

That is, the gist of this invention is that at least the magnetic recording layer is formed on one of the main surfaces and the substrate forming component elution preventing layer adapted to prevent the component forming the magnetic disk glass substrate from being eluted from the other main surface is formed on the other main surface, thereby blocking the elution of the substrate forming component from the main surface not used as a magnetic recording surface so as to suppress the occurrence of corrosion on the surface not used as the magnetic recording surface.

In this invention, as shown in FIG. 3, at least a buffer layer 18 serving as the substrate forming component elution preventing layer is formed on the surface (lower surface in FIG. 3), not intended to be used for the magnetic recording layer, of the magnetic disk glass substrate. Based on the knowledge shown in FIG. 4, the thickness of the buffer layer 18 is preferably 4 nm or more. Ti, Cr, carbon, or the like can be cited as a material forming the buffer layer 18.

It is considered that if the magnetic recording layer and so on are formed on the main surface (surface A) intended to be used for the magnetic recording layer while no layer is formed on the main surface (surface B) not intended to be used for the magnetic recording layer, the balance of film stress is lost between the surface A and the surface B so that the magnetic disk is warped. Taking this into account, it is preferable to form a disk warp preventing layer 19 on the buffer layer 18 as shown in FIG. 3. As a material forming the disk warp preventing layer 19, there can be cited one of the materials of the layers formed on the surface A, for example, a Cr alloy. In this case, it is preferable that the total thickness of the layers formed on the surface A and the total thickness of the layers formed on the surface B be set equal to each other. Accordingly, it is desirable to appropriately determine the thickness of the disk warp preventing layer 19 taking into account the structures and thicknesses of the layers formed on the surface A so that the total thicknesses of the layers on both main surfaces are set equal to each other. By providing the disk warp preventing layer 19 on the buffer layer 18 as described above, it is possible to prevent warping of the disk while blocking the elution of the substrate forming component more effectively. Further, if necessary, a protective layer and a lubricating layer adapted to be formed on the surface A may also be formed on the buffer layer 18 or the disk warp preventing layer 19.

Herein, a description will be given of the case where, with respect to the manufactured magnetic disk glass substrate, the main surface (surface A) intended to be used as the magnetic recording surface is identified and the magnetic recording layer and so on are formed on the identified main surface to thereby manufacture the magnetic disk.

The manufactured magnetic disk glass substrate has the main surface (surface A) intended to be used as the magnetic recording surface and the main surface (surface B) not intended to be used as the magnetic recording surface. Therefore, in consideration of the magnetic disk manufacturing process, it is necessary to identify the surface A of the manufactured magnetic disk glass substrate so that the magnetic recording layer and so on are formed on the surface A without fail. The glass substrate is transparent and further the surface B also has the arithmetic mean roughness of the predetermined level, and therefore, it is extremely difficult to accurately identify the surface A by visual observation. In view of this, for example, the surface A is accurately identified using a visual inspection apparatus 2 for automated optical inspection (AOI; Automated Optical Inspection) as shown in FIG. 5.

Figure 5:
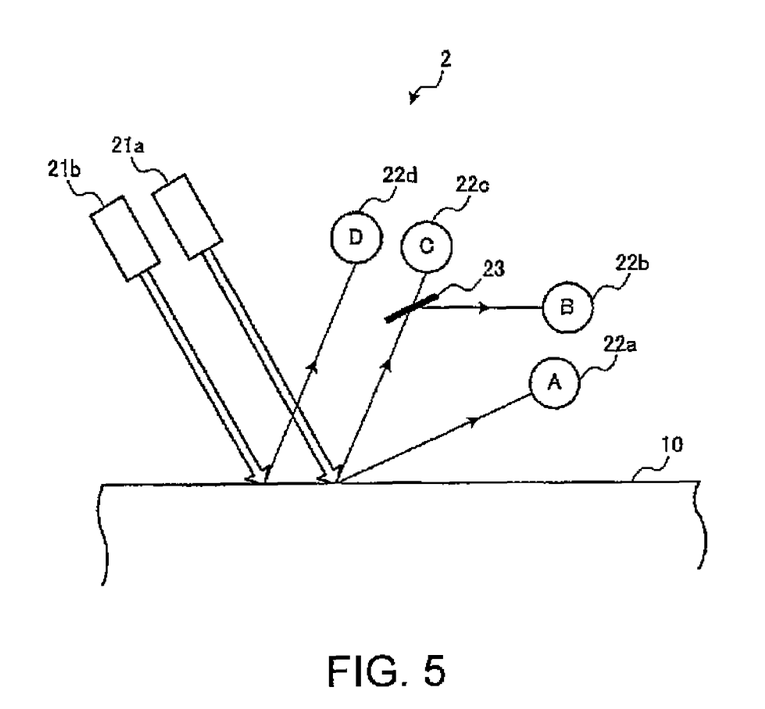
FIG. 5 is a diagram showing one example of the structure of a magnetic disk according to the embodiment of this invention.

The visual inspection apparatus 2 shown in FIG. 5 comprises two defect detection probe lasers 21a and 21b and four detectors 22a to 22d each adapted to detect scattered light, in substantially all directions, of laser light. The two defect detection probe lasers 21a and 21b are disposed spaced apart from each other with the same laser output direction. The defect detection probe laser 21a emits measurement laser light while the defect detection probe laser 21b emits reference laser light. The detectors 22a, 22b, and 22c are disposed at positions capable of detecting diffracted/scattered light at a laser irradiation position of the defect detection probe laser 21a and each detect diffracted/scattered light from a magnetic disk glass substrate 10 to obtain scattered light intensity information. The detector 22b is disposed so as to detect one of light beams split by a beam splitter 23 disposed before the detector 22c. The detector 22d is disposed at a position capable of detecting diffracted/scattered light at a laser irradiation position of the defect detection probe laser 21b and detects reference diffracted/scattered light from the magnetic disk glass substrate 10 to obtain reference scattered light intensity information. The magnitude of arithmetic mean roughness is judged based on the scattered light intensity information and the reference scattered light intensity information thus obtained. That is, the scattered light intensity is relatively large on a main surface (surface B) where the arithmetic mean roughness is large, while, the scattered light intensity is relatively small on a main surface (surface A) where the arithmetic mean roughness is small, and therefore, the difference between the scattered light intensity and the reference scattered light intensity is relatively large on the surface B while the difference between the scattered light intensity and the reference scattered light intensity is relatively small on the surface A.

Using samples separately produced, the relationship between the arithmetic mean roughness (Ra) and the scattered light intensity was examined. The results are shown in Table 1. From the shown relationship, the surface A and the surface B can be identified by AOI.

TABLE 1

| | | Scattered Light Intensity (P-V, mV) | | | |
| --- | --- | --- | --- | --- | --- |
| | | Ave | Max | Min | N (Number of Measurement Surfaces) |
| Ra (nm) | 0.15 | 8 | 10 | 6 | 30 |
| | 0.22 | 12 | 18 | 7 | 30 |
| | 0.29 | 17 | 26 | 10 | 30 |
| | 6.00 | 136 | 178 | 112 | 30 |

In the visual inspection apparatus 2 shown in FIG. 5, the laser diameter is, for example, as small as about 5 μm and thus the laser wavelength is short and the power is large, and therefore, the identification accuracy is high. In the visual inspection apparatus 2 having such a structure, while moving the magnetic disk glass substrate 10, laser light is irradiated onto the surface of the magnetic disk glass substrate 10 from the two defect detection probe lasers 21a and 21b and diffracted/scattered light at that time instant is detected by the respective detectors 22a to 22d. Thereafter, output signals of the respective detectors 22a to 22d are input into a judgment circuit (not illustrated) and the judgment circuit identifies the surface A/surface B of the magnetic disk glass substrate 10 based on the output signals.

Next, a description will be given of tests which were conducted for clarifying the effect of this invention.

<Manufacture of Magnetic Disk Glass Substrate>

(Tests 1 to 4)

First, a molten aluminosilicate glass was formed into a disk shape by direct pressing using upper, lower, and drum molds, thereby obtaining an amorphous plate-like glass member (blank). In this event, the diameter of the blank was 66 mm. Then, first lapping was applied to both main surfaces of the blank and then, using a cylindrical core drill, processing (coring) was carried out to form a hole at a central portion of the blank, thereby obtaining an annular glass substrate. Then, a chamfering process (chamfered face forming process) was carried out to form chamfered faces at end portions (outer peripheral end portion and inner peripheral end portion) and then second lapping was carried out.

Then, the outer peripheral end portion of the glass substrate was mirror-polished by a brush polishing method. In this event, as polishing abrasive particles, use was made of a slurry (free abrasive particles) containing cerium oxide abrasive particles.

Then, the mirror-polished glass substrate was washed with water. As a consequence, the diameter of the glass substrate became 65 mm, thereby obtaining a substrate for use in a 2.5-inch magnetic disk.

Then, a first polishing process was applied as a main surface polishing process to both main surfaces of the glass substrate. In the first polishing process, a double-side polishing machine was used as a polishing machine. As polishing pads in this polishing machine, soft suede pads were used. As a polishing agent, a cerium polishing agent was used. Polishing conditions were such that the processing surface pressure was set to 130 g/cm$^2$ and the processing rotational speed was set to 22 rpm. As a consequence, the arithmetic mean roughness (Ra) of the glass substrate became about 1.5 nm.

Then, in the state where the main surface, not intended to be used as a magnetic recording surface, of the glass substrate was masked, a second polishing process was applied only to the main surface intended to be used as a magnetic recording surface. In the second polishing process, a double-side polishing machine was used as a polishing machine. As polishing pads in this polishing machine, soft suede pads (Asker C hardness: 54, compressive deformation amount: 476 μm or more, density: 0.53 g/cm$^3$ or less) were used. As a polishing agent, use was made of a cerium polishing agent having an average particle size of 100 nm. Polishing conditions were such that the processing surface pressure was set to 60 g/cm$^2$ and the processing rotational speed was set to 20 rpm. The arithmetic mean roughness (Ra) of the main surface, intended to be used as the magnetic recording surface, of the glass substrate became about 0.30 nm.

The glass substrate having been subjected to the second polishing process was immersed in a KOH solution and cleaned for 120 seconds with the application of an ultrasonic wave, then scrub-cleaned for 4 seconds using an alkaline cleaning solution, then cleaned using highly diluted sulfuric acid and the above-mentioned alkaline cleaning solution, and then subjected to IPA (isopropyl alcohol) steam drying.

Then, the glass substrate having been subjected to the above-mentioned second polishing process was chemically strengthened. The chemical strengthening was carried out by preparing a chemical strengthening solution in the form of a mixture of potassium nitrate (60%) and sodium nitrate (40%), heating this chemical strengthening solution to 380° C., and immersing the cleaned glass substrate in the chemical strengthening solution for about 4 hours. Then, this chemically strengthened glass substrate was subjected to acid cleaning, alkaline cleaning, and pure water cleaning in this order. In this manner, a magnetic disk glass substrate was manufactured.

(Tests 5 to 15)

Magnetic disk glass substrates having arithmetic surface roughnesses shown in Table 2 were manufactured in the same manner as in Tests 1 to 4 except that the polishing conditions were changed and that first polishing was carried out in the state where a main surface, not intended to be used as a magnetic recording surface, of a glass substrate was masked.

With respect to 100 glass substrates of each test thus obtained, a corrosion test was carried out in which the glass substrates were exposed to an 80° C., 80% RH environment for 7 days. The glass substrates after the corrosion test were observed with an optical microscope (×200 magnification) to thereby measure the number of luminescent spots per unit area (region of about 200 μm×300 μm). The results are shown in Table 2.

<Formation of Layers>

An adhesive layer, a soft magnetic layer, a nonmagnetic underlayer, a perpendicular magnetic recording layer, a protective layer, and a lubricating layer were laminated in this order on the surface A of each of the manufactured magnetic disk glass substrates. As shown in Table 2, a titanium layer was formed as a buffer layer on the surface B with respect to some samples. In this manner, magnetic disks were manufactured. 100 magnetic disks thus obtained were exposed to a 65° C., 90% RH environment for 5 days and then assembled into HDD devices, respectively. Then, a seek test was carried out (counting the number of read/write errors (R/W errors) during 40,000,000 times seeking). The results are shown in Table 2.

The invention claimed is:

1. A method of manufacturing a magnetic disk glass substrate for use in manufacturing a magnetic disk, comprising:
    a main surface polishing step of polishing a glass substrate having a pair of main surfaces,
    wherein, the main surface polishing step comprises (1) main surface polishing one of the main surfaces of the glass substrate so that the one main surface has an arithmetic mean roughness (Ra) required for magnetic recording, and (2) main surface polishing the other main surface of the glass substrate so that the other main surface has a roughness which is higher than the arithmetic mean roughness (Ra) of the one main surface and which is low enough to prevent elution of a component forming the magnetic disk glass substrate and which is not required for the magnetic recording,
    wherein the arithmetic mean roughness (Ra) of the one main surface is 0.30 nm or less while the roughness of the other main surface falls within a range of 1.5 nm to 5 nm, and
    wherein the magnetic disk has only on the one main surface a magnetic recording layer.

2. The magnetic disk glass substrate manufacturing method according to claim 1, wherein, in the main surface polishing step, the number of times of main surface polishing for the other main surface of the glass substrate is smaller than the number of times of main surface polishing for the one main surface of the glass substrate.

3. The magnetic disk glass substrate manufacturing method according to claim 1, wherein the main surface polishing is applied to the one main surface of the glass substrate so that the arithmetic mean roughness (Ra) of the one main surface becomes 0.30 nm or less.

4. The magnetic disk glass substrate manufacturing method according to claim 1, further comprising:
    a step of identifying the one main surface of the glass substrate by optical automatic visual inspection.

5. A method of manufacturing a magnetic disk comprising a magnetic disk glass substrate and at least a magnetic recording layer formed on the magnetic disk glass substrate,

TABLE 2

|  | Surface Roughness of Surface A (nm) | Surface Roughness of Surface B (nm) | Corrosion Test | Buffer Layer | Buffer Layer Thickness (nm) | Seek Test |
| --- | --- | --- | --- | --- | --- | --- |
| Test 1 | 0.3 | 1.5 | 1 or less | present | 3 | 5 or less |
| Test 2 | 0.3 | 1.5 | 1 or less | present | 4 | 5 or less |
| Test 3 | 0.3 | 1.5 | 1 or less | present | 10 | 5 or less |
| Test 4 | 0.3 | 1.5 | 1 or less | absent | 0 | 8 or less |
| Test 5 | 0.3 | 3 | 1 or less | present | 4 | 5 or less |
| Test 6 | 0.3 | 3 | 1 or less | absent | 0 | 10 or less |
| Test 7 | 0.3 | 5 | 5 or less | present | 4 | 5 or less |
| Test 8 | 0.3 | 5 | 5 or less | absent | 0 | 8 or less |
| Test 9 | 0.3 | 6 | 20 or more | present | 3 | 12 or more |
| Test 10 | 0.3 | 6 | 20 or more | present | 4 | 5 or less |
| Test 11 | 0.3 | 6 | 20 or more | present | 10 | 5 or less |
| Test 12 | 0.3 | 6 | 20 or more | absent | 0 | 40 or more |
| Test 13 | 0.3 | 7 | 120 or more | present | 4 | 100 or more |
| Test 14 | 0.3 | 7 | 120 or more | present | 10 | 50 or more |
| Test 15 | 0.3 | 7 | 120 or more | absent | 0 | 150 or more |

From Table 2, it was possible to suppress the occurrence of corrosion by setting the surface roughness of the surface B to 5 nm or less. Further, it was possible to reduce the number of read/write errors by forming the buffer layer on the surface B.

wherein the magnetic disk glass substrate has a pair of polished main surfaces, one of the main surfaces has an arithmetic mean roughness (Ra) required for magnetic recording, the other main surface has a roughness which is higher than the arithmetic mean roughness (Ra) of the one main surface and which is low enough to prevent elution of a component forming the magnetic disk glass substrate and which is not required for the magnetic recording, at least the magnetic recording layer is formed only on the one of the main surfaces, and the arithmetic mean roughness (Ra) of the one main surface comprising the magnetic recording layer is 0.30 nm or less while the roughness of the other main surface comprising no magnetic recording layer falls within a range of 1.5 nm to 5 nm.

6. A method of manufacturing a magnetic disk comprising a magnetic disk glass substrate obtained through a main surface polishing step of polishing a glass substrate having a pair of main surfaces and at least a magnetic recording layer formed on the magnetic disk substrate, the method comprising:

forming at least the magnetic recording layer on only one of the main surfaces, and forming, on the other main surface, a substrate forming component elution preventing layer adapted to prevent a component forming the magnetic disk glass substrate from being eluted from the other main surface, wherein the substrate forming component elution preventing layer has a thickness of 4 nm or more, an arithmetic mean roughness (Ra) of one main surface comprising the magnetic recording layer is 0.30 nm or less while the roughness of the other main surface comprising no magnetic recording layer falls within a range of 1.5 nm to 6 nm, and the substrate forming component elution preventing layer is made of a film of titanium alone or a titanium alloy.

7. The magnetic disk manufacturing method according to claim 6, wherein at least final main surface polishing is not carried out for the other main surface of the magnetic disk glass substrate.

* * * * *